United States Patent
Jung et al.

(10) Patent No.: US 12,397,436 B2
(45) Date of Patent: Aug. 26, 2025

(54) DEVICE FOR CONTROLLING MOVEMENT SPEED OF ROBOT AND METHOD THEREFOR

(71) Applicants: Hyundai Motor Company, Seoul (KR); Kia Corporation, Seoul (KR)

(72) Inventors: Hyeon Seok Jung, Suwon-si (KR); Kyung Hwan Cho, Anyang-si (KR); Min Kyu Lee, Seoul (KR); Moon Sub Jin, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 377 days.

(21) Appl. No.: 17/813,373

(22) Filed: Jul. 19, 2022

(65) Prior Publication Data
US 2023/0278226 A1   Sep. 7, 2023

(30) Foreign Application Priority Data
Mar. 4, 2022   (KR) .......................... 10-2022-0028414

(51) Int. Cl.
*B25J 9/16*   (2006.01)
*G05D 1/00*   (2006.01)
*G06V 40/16*   (2022.01)

(52) U.S. Cl.
CPC .......... *B25J 9/1697* (2013.01); *G05D 1/0223* (2013.01); *G06V 40/161* (2022.01); *G06V 40/178* (2022.01)

(58) Field of Classification Search
USPC ................................................... 700/245–264
See application file for complete search history.

(56) References Cited

U.S. PATENT DOCUMENTS

| | | | | |
|---|---|---|---|---|
| 8,996,429 | B1 * | 3/2015 | Francis, Jr. ............ | G06N 3/008 706/45 |
| 9,776,327 | B2 * | 10/2017 | Pinter .................... | B25J 9/1676 |
| 10,558,912 | B2 * | 2/2020 | Kwak ....................... | G06N 3/08 |
| 11,364,631 | B2 * | 6/2022 | Han ....................... | B25J 11/008 |
| 12,175,741 | B2 * | 12/2024 | Taamazyan ............... | G06T 7/70 |
| 2006/0117324 | A1 * | 6/2006 | Alsafadi ................ | G06N 3/008 719/320 |
| 2013/0273968 | A1 * | 10/2013 | Rhoads ................... | H04W 4/50 455/566 |
| 2016/0180195 | A1 * | 6/2016 | Martinson ............ | G06V 10/764 382/103 |

(Continued)

FOREIGN PATENT DOCUMENTS

| | | | | |
|---|---|---|---|---|
| CA | 3098172 | A1 * | 10/2019 | ............. G06V 20/10 |
| CN | 107393532 | A | 11/2017 | |

(Continued)

*Primary Examiner* — Jonathan L Sample
(74) *Attorney, Agent, or Firm* — Slater Matsil, LLP

(57) ABSTRACT

An embodiment device includes a memory configured to store a lookup table in which target speeds corresponding to genders and ages are recorded and a controller configured to detect a face from an image photographed by a camera provided in a robot, estimate a gender and an age corresponding to the face based on a deep learning model, search the lookup table for a target speed corresponding to the estimated gender and the estimated age, and determine the target speed as a movement speed of the robot.

20 Claims, 7 Drawing Sheets

(56) References Cited

U.S. PATENT DOCUMENTS

| | | | |
|---|---|---|---|
| 2016/0379263 A1* | 12/2016 | Uhalley | G06Q 30/0261 |
| | | | 705/14.58 |
| 2018/0018714 A1* | 1/2018 | Uhalley | G06Q 30/0269 |
| 2018/0111272 A1* | 4/2018 | Zhang | G05D 1/0255 |
| 2018/0114125 A1* | 4/2018 | Ichiboshi | A61B 5/0077 |
| 2018/0150684 A1* | 5/2018 | Wang | G06V 10/454 |
| 2019/0077021 A1* | 3/2019 | Hayashi | A61B 10/0012 |
| 2020/0164515 A1* | 5/2020 | Han | G05D 1/0274 |
| 2020/0411015 A1* | 12/2020 | Kim | B25J 9/163 |
| 2021/0011484 A1* | 1/2021 | Park | G05D 1/0214 |
| 2021/0049349 A1* | 2/2021 | Farokhi | G06V 40/166 |
| 2021/0070323 A1* | 3/2021 | Kim | B60W 50/082 |
| 2021/0078598 A1 | 3/2021 | Kim | |
| 2021/0081993 A1* | 3/2021 | Hiramatsu | G06F 16/29 |
| 2022/0021742 A1* | 1/2022 | Zhang | G06V 40/172 |
| 2022/0044337 A1* | 2/2022 | Sato | G01C 21/3492 |
| 2022/0114868 A1* | 4/2022 | Bronicki | G06V 20/52 |

FOREIGN PATENT DOCUMENTS

| | | | | |
|---|---|---|---|---|
| CN | 107909026 A | * | 4/2018 | G06K 9/00228 |
| CN | 109949807 A | | 6/2019 | |
| KR | 20090112130 A | | 10/2009 | |
| KR | 20110060039 A | | 6/2011 | |
| KR | 20180022385 A | | 3/2018 | |
| KR | 20180038870 A | | 4/2018 | |
| KR | 20190037669 A | | 4/2019 | |
| KR | 102139548 B1 | | 7/2020 | |
| KR | 20210007295 A | | 1/2021 | |
| WO | WO-2019204945 A1 | * | 10/2019 | G06V 20/10 |

* cited by examiner

DEVICE FOR CONTROLLING MOVEMENT SPEED OF ROBOT AND METHOD THEREFOR

CROSS-REFERENCE TO RELATED APPLICATIONS

This application claims the benefit of Korean Patent Application No. 10-2022-0028414, filed on Mar. 4, 2022, which application is hereby incorporated herein by reference.

TECHNICAL FIELD

The present disclosure relates to a technology for adjusting a movement speed of a robot that provides various services (e.g., a product guide) according to characteristics of a user.

BACKGROUND

Generally, an artificial neural network (ANN) is a field of artificial intelligence, and is an algorithm for allowing a machine to be trained by simulating a human neural structure. Recently, the artificial neural network has been applied to image recognition, voice recognition, natural language processing, and the like, and has shown excellent effects. The artificial neural network consists of an input layer which receives an input, a hidden layer which actually learns, and an output layer which returns the results of operations. A deep neural network (DNN) with multiple hidden layers is also a kind of artificial neural network.

The artificial neural network allows a computer to learn from data. When trying to solve a problem using the artificial neural network, what is to be prepared is a suitable artificial neural network model and data to be analyzed. The artificial neural network model to solve a problem is trained based on data. Before training the model, it is necessary to classify the data into two types. That is, the data needs to be classified into a training dataset and a validation dataset. The training dataset is used to train the model, and the validation dataset is used to verify the performance of the model.

There are several reasons for validating the artificial neural network model. Artificial neural network developers perform tuning of the model by modifying hyperparameters of the model based on the verification result of the model. In addition, the model is validated to select which model is suitable among various models. The reasons for the need to validate the model are explained in more detail below.

The first reason is to predict accuracy. The purpose of artificial neural networks is to achieve good performance on out-of-sample data that is not used for training. Therefore, after creating the model, it is necessary to check how well the model will perform on out-of-sample data. However, it is required not to validate the model using the training dataset, so that the accuracy of the model needs to be measured using the validation dataset separate from the training dataset.

The second reason is to improve the performance of the model by tuning the model. For example, overfitting may be prevented. Overfitting refers to a state where a model is overtrained on the training dataset. For example, when the training accuracy is high but the validation accuracy is low, the possibility of overfitting may be suspected. Further, it can be understood in more detail through training loss and validation loss. When overfitting occurs, it is necessary to prevent overfitting to increase the validation accuracy. The overfitting may be prevented by using methods such as regularization or dropout.

A model (hereinafter, referred to as an inference model) in which a learning process and a verification process have been completed may be applied to various systems and utilized for various purposes. For example, in the process of adjusting a movement speed of a service robot, it may be used to recognize gender and age based on a face image.

As a conventional technology for controlling the movement speed of a service robot, there have been proposed techniques of detecting a height of a user from a user image, identifying whether the user is a child or an adult based on the height of the user, and further decreasing the movement speed of the service robot compared to the case of the adult when it is identified that the user is the child, to prevent collisions with children.

This prior art cannot accurately detect the height of the user when a part of the user's body is covered by a chair or the like. Furthermore, when a part of the user's body is covered by a chair and then reappears, there is a problem in that the movement speed of the service robot decreases and then increases again, which is an unnatural phenomenon.

The matters described in this background are prepared to enhance an understanding of the background of the present disclosure, and may include matters other than the prior art already known to those of ordinary skill in the field to which this technology belongs.

SUMMARY

Embodiments of the present disclosure can solve problems occurring in the prior art while advantages achieved by the prior art are maintained intact.

An embodiment of the present disclosure provides a device and method for controlling a movement speed of a robot capable of detecting and tracking a face from an image photographed by a camera provided in the robot, estimating a gender and an age corresponding to the face based on a deep learning model, and determining a target speed corresponding to the gender and the age as a movement speed of the robot to improve a user's satisfaction with the robot that provides various services, as well as to enable the stable movement of the robot.

The features of the present disclosure are not limited to the above-mentioned features, and other features and advantages of embodiments of the present disclosure which are not mentioned may be understood by the following description, and will be more clearly understood by exemplary embodiments of the present disclosure. It will also be readily apparent that the features and advantages of embodiments of the disclosure may be realized by means of the instrumentalities and combinations particularly pointed out in the appended claims.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a device for controlling a movement speed of a robot includes storage that stores a lookup table in which target speeds corresponding to genders and ages are recorded and a controller that detects a face from an image photographed by a camera provided in the robot, estimates a gender and an age corresponding to the face based on a deep learning model, searches the lookup table for a target speed corresponding to the estimated gender and the estimated age and determines the target speed as the movement speed of the robot.

According to an embodiment of the present disclosure, the controller may assign IDs to a plurality of faces respectively when the plurality of faces are detected in the image.

According to an embodiment of the present disclosure, the controller may track the detected face.

According to an embodiment of the present disclosure, the controller may estimate a gender and an age corresponding to a face detected in an n-th frame, estimate a gender and an age corresponding to a face detected in an (n+1)-th frame, and correct the gender and age which are estimated based on the (n+1)-th frame with the gender and age which are estimated in the n-th frame.

According to an embodiment of the present disclosure, the controller may estimate a gender and an age corresponding to a face detected in an (n+2)-th frame and additionally correct the gender and age which are estimated based on the (n+2)-th frame with the gender and age which are corrected.

According to an embodiment of the present disclosure, the controller may adjust a time required for the movement speed of the robot to reach the target speed.

According to an embodiment of the present disclosure, the controller may control the movement speed of the robot to be fast by decreasing the time.

According to an embodiment of the present disclosure, the controller may control the movement speed of the robot to be slow by increasing the time.

According to an embodiment of the present disclosure, the robot may be a product guide robot that explains the specifications and characteristics of each vehicle to customers and induces purchase of the vehicle while moving to each vehicle in a vehicle exhibition hall.

According to an embodiment of the present disclosure, the controller may output various guide messages by voice to induce customers to purchase products.

A method for controlling a movement speed of a robot includes storing a lookup table in which target speeds corresponding to genders and ages are recorded, detecting a face from an image photographed by a camera provided in the robot, estimating a gender and an age corresponding to the face based on a deep learning model, searching the lookup table for a target speed corresponding to the estimated gender and the estimated age, and determining the target speed as the movement speed of the robot.

According to an embodiment of the present disclosure, the detecting of the face may include assigning IDs to a plurality of faces respectively when the plurality of faces are detected in the image.

According to an embodiment of the present disclosure, the detecting of the face may include tracking the detected face.

According to an embodiment of the present disclosure, the estimating of the gender and the age corresponding to the face may include estimating a gender and an age corresponding to a face detected in an n-th frame, estimating a gender and an age corresponding to a face detected in an (n+1)-th frame, and correcting the gender and age which are estimated based on the (n+1)-th frame with the gender and age which are estimated in the n-th frame.

According to an embodiment of the present disclosure, the estimating of the gender and the age corresponding to the face may include estimating a gender and an age corresponding to a face detected in an (n+2)-th frame, and additionally correcting the gender and age which are estimated based on the (n+2)-th frame with the gender and age which are corrected.

According to an embodiment of the present disclosure, the determining of the movement speed of the robot may include decreasing a time required for the movement speed of the robot to reach the target speed to control the movement speed of the robot to be fast.

According to an embodiment of the present disclosure, the determining of the movement speed of the robot may include increasing a time required for the movement speed of the robot to reach the target speed to control the movement speed of the robot to be slow.

According to an embodiment of the present disclosure, the method may further include outputting various guide messages for inducing customers to purchase products by voice.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
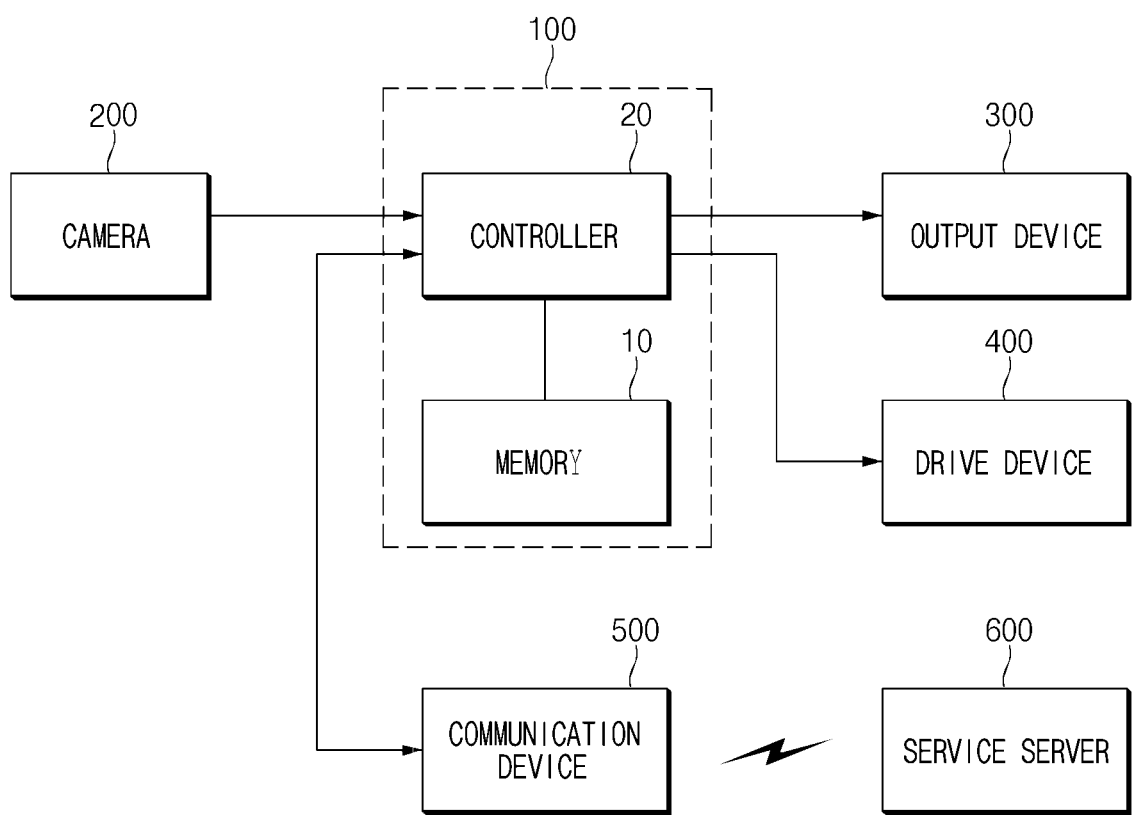
FIG. 1 is a configuration diagram of a device for controlling a movement speed of a robot according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a configuration diagram of a device for controlling a movement speed of a robot according to an embodiment of the present disclosure.

Referring to FIG. 1, a device 100 for controlling a movement speed of a robot according to an embodiment of the present disclosure may include a memory (i.e., storage) 10 and a controller 20. In this case, according to a method of implementing the device 100 for controlling a movement speed of a robot according to an embodiment of the present disclosure, the components may be combined with each other as one entity, or some components may be omitted.

A camera 200 may be provided in the robot to photograph customers who are provided with a product guide service.

An output device 300 may visually and audibly output a description of a product and a phrase inducing the purchase of the product. The output device 300 may include a display device that outputs the description of the product and the phrase inducing the purchase of the product to a screen, and an audio device that outputs the description of the product and the phrase inducing the purchase of the product by voice.

A drive device 400 is a kind of actuator that provides a driving force for moving the robot, and may adjust a movement speed of a robot to reach a target speed determined by the controller 20.

A communication device 500 is a module that provides a communication interface with a service server 600, and may receive various types of control data, guide data, and driving data from the service server 600, and transmit error data and response data to the service server 600. The communication device 500 may include at least one of a mobile communication module, a wireless Internet module, and a short-range communication module.

A mobile communication module may communicate with the service server 600 through a mobile communication network which is established according to a technical standard or a communication scheme for mobile communication (e.g., Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), LTE-A (Long Term Evolution-Advanced), 4G (4th Generation mobile telecommunication), 5G (5th Generation mobile telecommunication and the like.

The wireless Internet module may be a module for access to wireless Internet and may communicate with the service server 600 through Wireless LAN (WLAN), Wireless-Fidelity (Wi-Fi), Wi-Fi Direct, Digital Living Network Alliance (DLNA), Wireless Broadband (WiBro), WiMAX (World Interoperability for Microwave Access (HSDPA), High Speed Downlink Packet Access (HSDPA), High Speed Uplink Packet Access (HSUPA), Long Term Evolution (LTE), Long Term Evolution-Advanced (LTE-A), or the like.

The short-range communication module may support short-range communication with the service server 600 using at least one of Bluetooth™, Radio Frequency Identification (RFID), Infrared Data Association (IrDA), Ultra Wideband (UWB), ZigBee, Near Field Communication (NFC), and Wireless USB (Wireless Universal Serial Bus) technologies.

On the other hand, the components of the device for controlling the movement speed of the robot will be described. First, the memory 10 may store various logics, algorithms, and programs required in the process of detecting and tracking a face in an image photographed by the camera 200 provided in the robot, estimating the gender and age corresponding to the face based on a deep-learning model, and determining a target speed corresponding to the gender and age as a movement speed of the robot.

The memory 10 may store a deep learning model capable of estimating a gender and an age from a face image. This deep learning model is a kind of inference model in which supervised learning has been completed based on training data (various face images).

The memory 10 may store a lookup table in which target speeds are recorded in correspondence with genders and ages. The lookup table is shown in Table 1 below as an example.

TABLE 1

| Gender | | Target speed(m/s) |
|---|---|---|
| Male | Under 13-years old | 0.7 |
| | 13 to 40-years old | 1.0 |
| | 40 to 50-years old | 0.5 |
| | . . . | . . . |
| Female | Under 13-years old | 0.6 |
| | 13 to 40-years old | 0.9 |
| | 40 to 50-years old | 0.4 |
| | . . . | . . . |

Table 1 may be applied to a product guide robot that performs a function of explaining the specifications and characteristics of each vehicle to customers and inducing purchase of the vehicle while moving to each vehicle in a vehicle exhibition hall.

The memory 10 may store a table in which various guides for inducing a customer to purchase a product are recorded. Such a table is shown in Table 2 below as an example.

TABLE 2

| Gender | Age | Guide message |
|---|---|---|
| Male | Late teens | Elantra suits you well. |
| | 20s | GV80 suits you well. |
| | 40s | G90 suits you well. |
| | . . . | . . . |
| Female | Late teens | Kona suits you well. |
| | 20s | IONIQ 5 suits you well. |
| | 40s | G90 suits you well. |
| | . . . | . . . |

The memory 10 may include at least one type of storage medium of memories such as a flash memory type memory, a hard disk type memory, a micro type memory, and a card type memory (e.g., an SD card (Secure Digital Card) or an XD card (eXtream Digital Card)), a RAM (Random Access Memory), an SRAM (Static RAM), a ROM (Read Only Memory), a PROM (Programmable ROM), an EEPROM (Electrically Erasable PROM), a MRAM (Magnetic RAM), a magnetic disk, and an optical disk type memory.

The controller 20 may perform overall control such that each of the above components normally performs its function. The controller 20 may be implemented in the form of hardware or software, or may be implemented in a combination of hardware and software. Preferably, the controller 20 may be implemented with a microprocessor, but is not limited thereto.

In particular, the controller 20 may perform various controls in the process of detecting and tracking a face in an image photographed by the camera 200 provided in the robot, estimating a gender and an age corresponding to the face based on the deep-learning model stored in the memory 10, searching the lookup table stored in the memory 10 for a target speed corresponding to the estimated gender and the estimated age, and determining the target speed as a movement speed of the robot.

Hereinafter, the operation of the controller 20 will be described in detail with reference to FIGS. 2 to 5.

Figure 2:
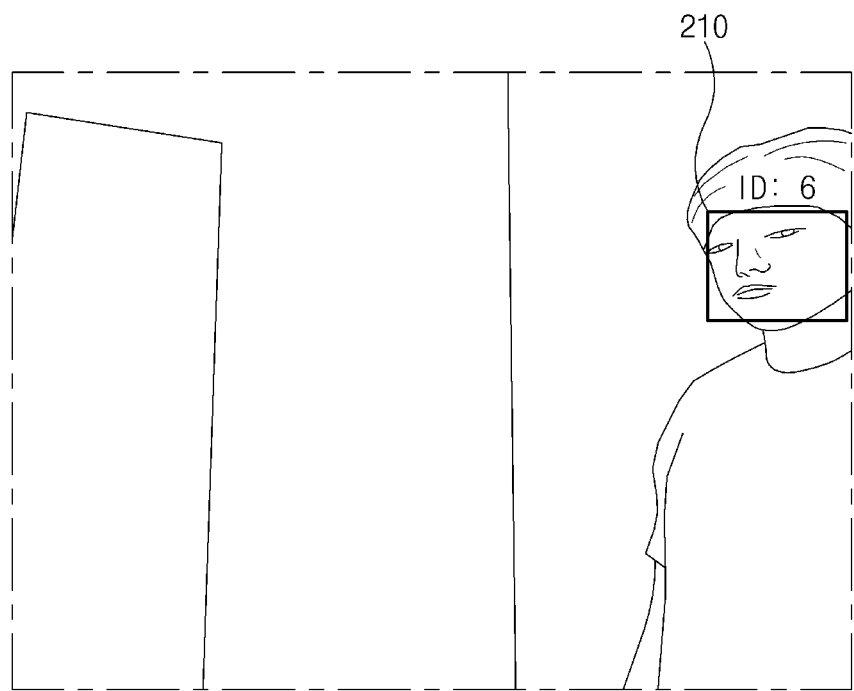
FIG. 2 is an exemplary view of a face region in an image detected by a controller provided in a device for controlling a movement speed of a robot according to an embodiment of the present disclosure.

FIG. 2 is an exemplary view of a face region in an image detected by a controller provided in a device for controlling a movement speed of a robot according to an embodiment of the present disclosure.

As shown in FIG. 2, the controller 20 may detect a face region 210 as an object in an image photographed by the camera 200 based on various object detection techniques. In this case, when there are a plurality of face regions in the image, all of the face regions may be detected and different IDs may be assigned to distinguish the face regions from each other. For example, ID 1 may be assigned to a first face region, ID 2 may be assigned to a second face region, and ID 3 may be assigned to a third face region. It can be seen from FIG. 2 that ID 6 is assigned to the face region 210 as an example.

The controller 20 may use a deep learning model in the process of detecting the face region 210 in an image photographed by the camera 200. In this case, the deep learning model is a model in which supervised learning has been completed based on various training data (images including faces).

Figure 3:
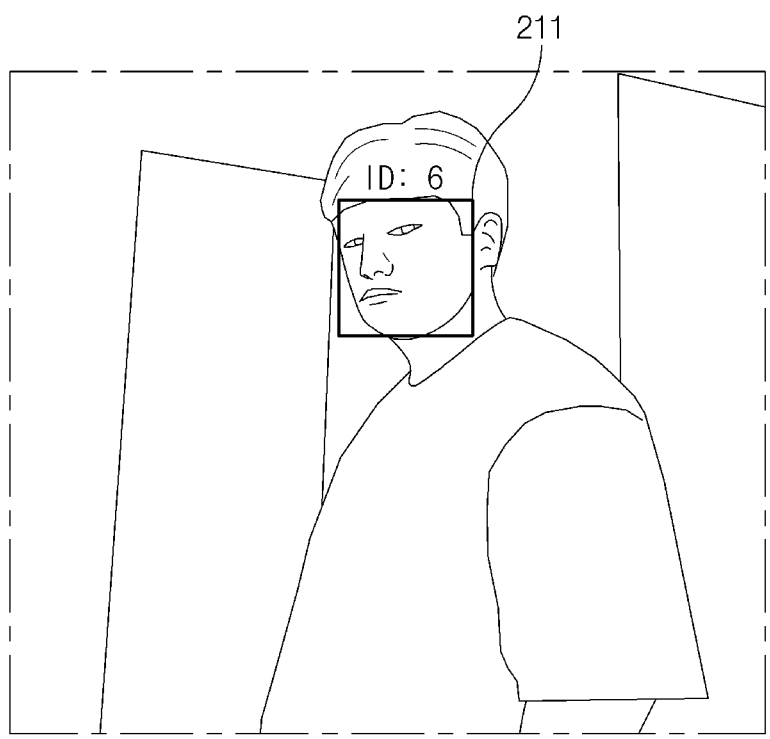
FIG. 3 is an exemplary view showing a face region in an image primarily tracked by a controller provided in a device for controlling a movement speed of a robot according to an embodiment of the present disclosure.

FIG. 3 is an exemplary view showing a face region in an image primarily tracked by a controller provided in a device for controlling a movement speed of a robot according to an embodiment of the present disclosure.

As shown in FIG. 3, the controller 20 may continuously track the face region 210 in the image, and reference numeral '211' indicates the face region tracked as described above. That is, the face region 210 of FIG. 2 and the face region 211 of FIG. 3 are face regions of the same person, and therefore, the same ID (e.g., ID 6) may be assigned.

Figure 4:
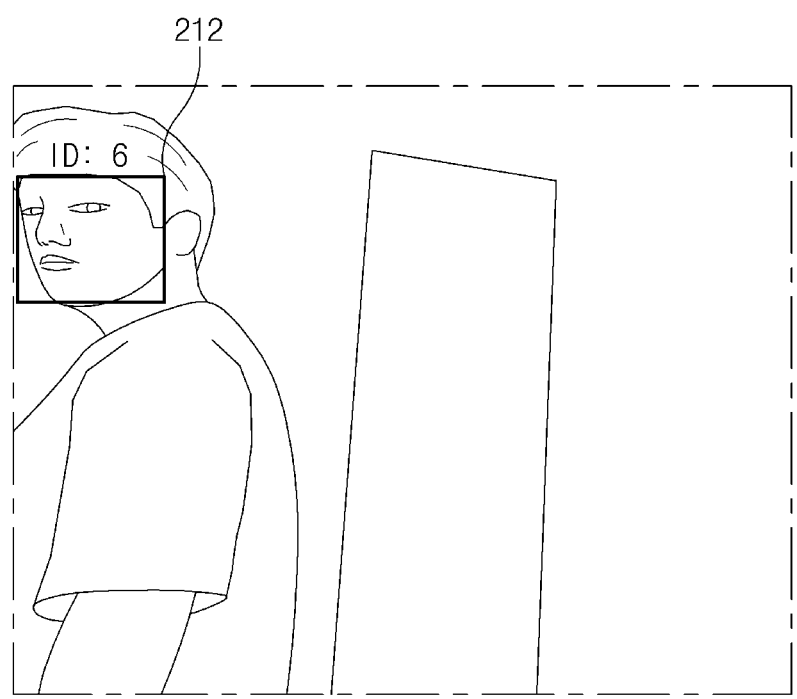
FIG. 4 is an exemplary view showing a face region in an image secondly tracked by a controller provided in a device for controlling a movement speed of a robot according to an embodiment of the present disclosure.

FIG. 4 is an exemplary view showing a face region in an image secondly tracked by a controller provided in a device for controlling a movement speed of a robot according to an embodiment of the present disclosure.

As shown in FIG. 4, the controller 20 may continuously track the face region 210 in the image, and reference numeral '212' indicates the face region tracked as described above. As a result, the controller 20 may detect the face region 210 of FIG. 2 and continuously track the face region 210 of FIG. 2 like the face region 211 of FIG. 3 and the face region 212 of FIG. 4. In this case, the image of FIG. 2 may be an n-th frame, the image of FIG. 3 may be an (n+1)-th frame, and the image of FIG. 4 may be an (n+2)-th frame.

When a plurality of face regions are detected in an image, the controller 20 may assign different IDs to the face regions and track the plurality of face regions based on the IDs. Hereinafter, a face region in an image is referred to as a face image.

Meanwhile, the controller 20 may estimate a gender and an age corresponding to a face image based on the deep learning model stored in the memory 10.

For example, when the controller 20 detects the face image ID 6 in the n-th frame, the controller 20 may estimate a gender and an age corresponding to the face image ID 6 detected in the n-th frame based on the deep learning model stored in the memory 10.

As another example, when the controller 20 tracks the face image ID 6, which has been detected in the n-th frame, in the (n+1)-th frame, the controller 20 may estimate the gender and the age corresponding to the face image ID 6 detected in the n-th frame, and estimate the gender and the age corresponding to the face image ID 6, which has been tracked in the (n+1)-th frame, based on the deep learning model stored in the memory 10. Thereafter, the controller 20 may correct the gender and age corresponding to the face image ID 6 tracked in the (n+1)-th frame by using an average filter. Here, the average filter $A_{filter}$ may be expressed as in Equation 1 below.

$$A_{filter}(k) = \frac{k-1}{k} \times A_{filter}(k-1) + \frac{1}{k} \times x_k \qquad \text{Equation 1}$$

Here, $A_{filter}(k)$ represents a corrected gender or age, k represents the number of face images, $A_{filter}(k-1)$ represents a previous gender or age, and $x_k$ represents a current gender or age.

For example, when the controller 20 estimates the age of the face image ID 6 detected in the n-th frame as 32, and the age of the face image ID 6 tracked in the (n+1)-th frame as 34, the corrected age may be 33 (0.5×32+0.5×34). In addition, when the age of the face image ID 6 tracked in the (n+2)-th frame is estimated as 36, the additionally-corrected age may be 34 (0.67×33+0.33×36). In the process of correcting ages of hundreds to thousands of face images ID 6 as described above, an erroneously-estimated age in the specific face image ID 6 may be corrected. That is, it is possible to remove an age estimation error caused by the angle, lighting, distance, or the like of a face.

As another example, with respect to the gender, as an initial value, for example, a value of 0.3 may be set for female and a value of 0.7 may be set for male. When a value is 0.5 or less, the female may be determined, and when a value exceeds 0.5, the male may be determined. Thereafter, the method of correcting the gender is the same as the method of correcting the age, and through this, the male be determined through correction when the male is continuously estimated correctly and the female is occasionally estimated incorrectly.

Meanwhile, the controller 20 may detect a target speed corresponding to the estimated gender and age based on the lookup table stored in the memory 10. Also, the controller 20 may detect the target speed corresponding to the corrected gender and age based on the lookup table stored in the memory 10.

Figure 5:
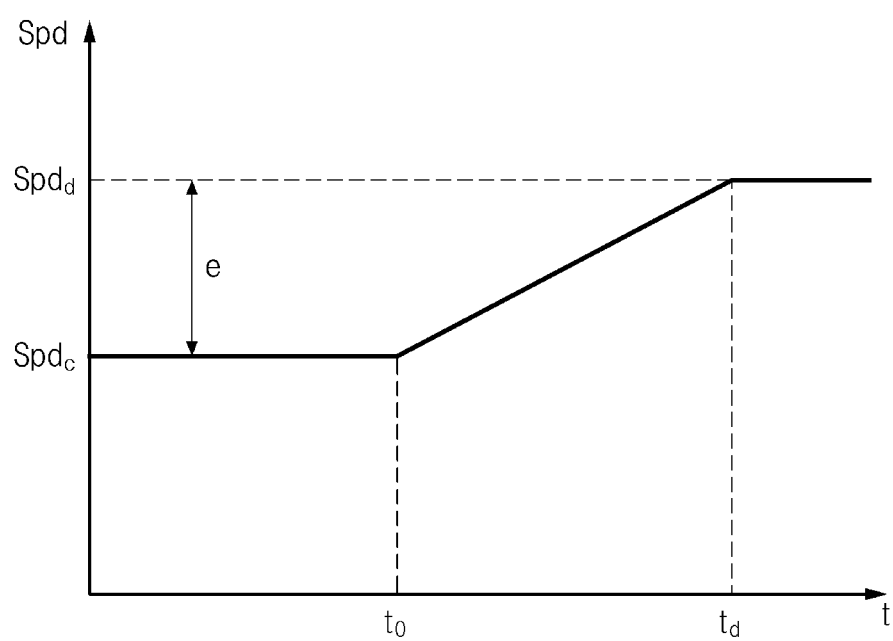
FIG. 5 is an exemplary view showing a process for adjusting a movement speed of a robot based on a target speed in a controller provided in a device for controlling a movement speed of a robot according to an embodiment of the present disclosure.

FIG. 5 is an exemplary view showing a process for adjusting a movement speed of a robot based on a target speed in a controller provided in a device for controlling a movement speed of a robot according to an embodiment of the present disclosure.

In FIG. 5, the vertical axis represents speed, and the horizontal axis represents time. In addition, 'spd$_c$' represents the current speed of the robot, 'spd$_d$' represents the target speed, 'e' represents the difference between the target speed and the current speed, t$_o$ represents the current time point (time), and t$_d$ represents a time point (time) required for the robot to reach the target speed.

The controller 20 may assign a weight to the current speed of the robot to reach the target speed. In this case, the weight "w" is an example, as in Equation 2 below.

$$w = \frac{e}{t_d} \times t \quad \text{Equation 2}$$

The controller 20 may control rapid and gentle movement of the robot by adjusting 't$_d$'. That is, the controller 20 may decrease 'td' when a rapid movement of the robot is required, and increase 't$_d$' when a gentle movement of the robot is required.

On the other hand, the controller 20 may also output by voice a guide message as shown in Table 2 stored in the memory 10.

Figure 6:
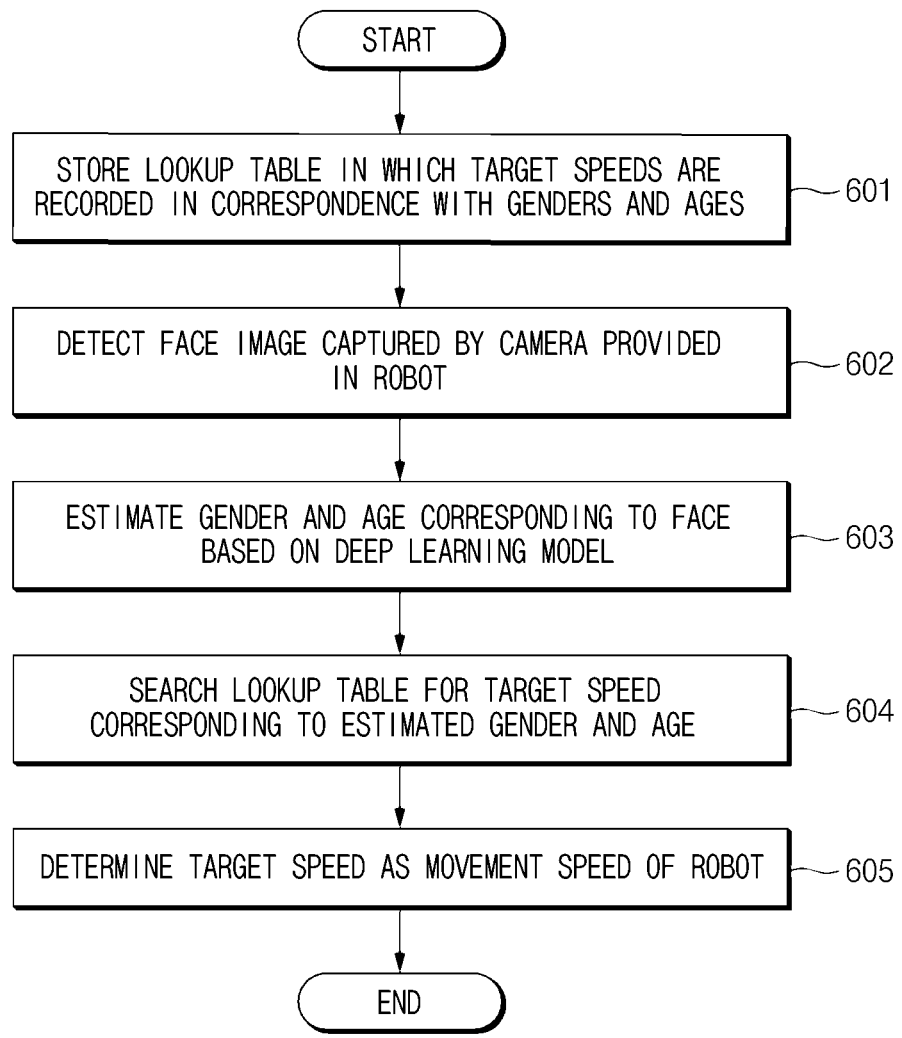
FIG. 6 is a flowchart of a method for controlling a movement speed of a robot according to an embodiment of the present disclosure.

FIG. 6 is a flowchart of a method for controlling a movement speed of a robot according to an embodiment of the present disclosure.

First, the memory 10 may store a lookup table in which target speeds corresponding to genders and ages are recorded (601).

Thereafter, the controller 20 may detect a face from an image photographed by a camera provided in a robot (602).

Thereafter, the controller 20 may estimate a gender and an age corresponding to the face based on the deep learning model (603).

Thereafter, the controller 20 may search the lookup table for a target speed corresponding to the estimated gender and the estimated age (604).

Thereafter, the controller 20 may determine the target speed as a movement speed of the robot (605).

Figure 7:
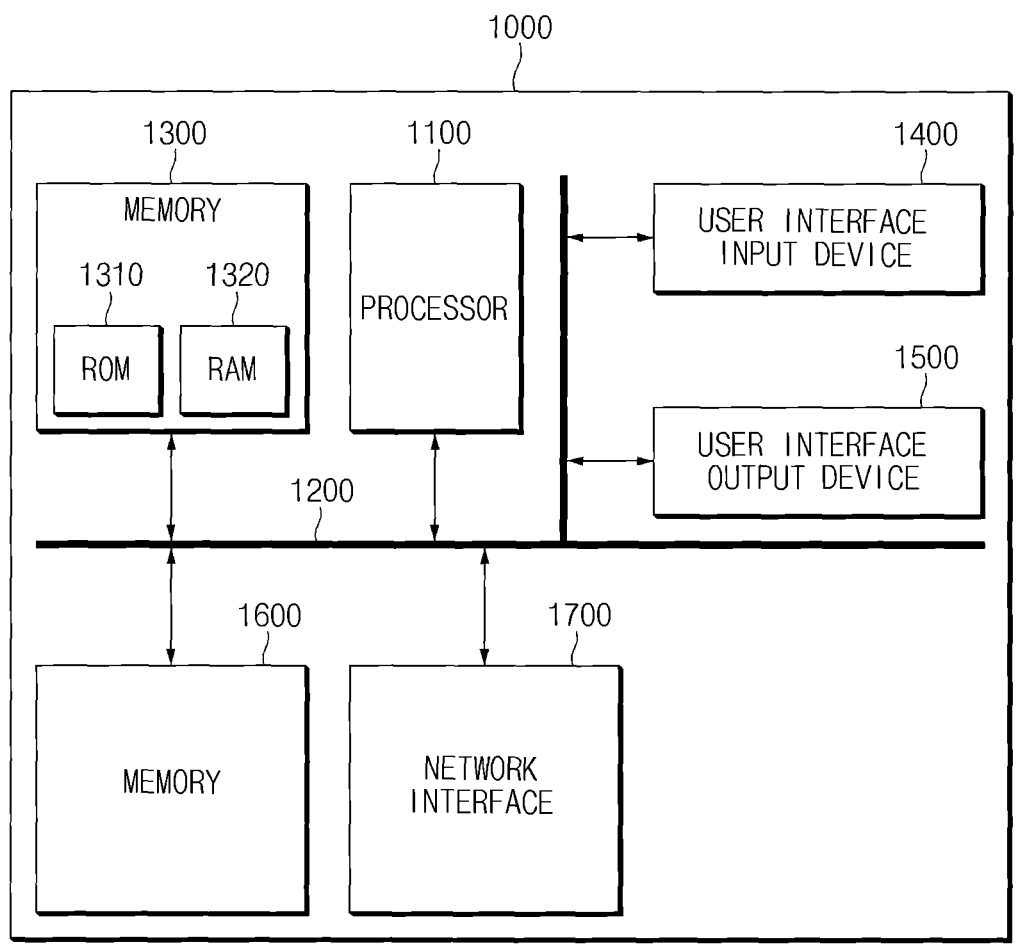
FIG. 7 is a block diagram illustrating a computing system for executing a method for controlling a movement speed of a robot according to an embodiment of the present disclosure.

FIG. 7 is a block diagram illustrating a computing system for executing a method of controlling a movement speed of a robot according to an embodiment of the present disclosure.

Referring to FIG. 7, the method of controlling a movement speed of a robot according to the embodiment of the present disclosure as described above may be also implemented through a computing system. A computing system 1000 may include at least one processor 1100, a memory 1300, a user interface input device 1400, a user interface output device 1500, a memory (i.e., storage) 1600, and a network interface 170o, which are connected with each other via a system bus 1200.

The processor 1100 may be a central processing unit (CPU) or a semiconductor device that processes instructions stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Thus, the operations of the methods or the algorithms described in connection with the embodiments disclosed herein may be embodied directly in hardware or a software module executed by the processor 1100, or in a combination thereof. The software module may reside on a storage medium (that is, the memory 1300 and/or the memory 160o) such as a RAM, a flash memory, a ROM, an EPROM, an EEPROM, a register, a hard disk, a solid state drive (SSD) a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

According to the device and method for controlling a movement speed of a robot according to the embodiments of the present disclosure, it is possible to detect a face from an image photographed by a camera provided in the robot, estimate a gender and an age corresponding to the face based on a deep learning model, and determine a target speed corresponding to the gender and the age as a movement speed of the robot, thus improving a user's satisfaction with the robot that provides various services, as well as enabling the stable movement of the robot.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device comprising:
   a memory configured to store a lookup table in which target speeds corresponding to genders and ages are recorded; and
   a controller configured to:
   detect a face from an image photographed by a camera provided in a robot;
   track the detected face;
   estimate a gender and an age corresponding to the face based on a deep learning model by:
   estimating the gender and the age corresponding to the face detected in a first frame;
   estimating the gender and the age corresponding to the face detected in a second frame; and
   correcting the gender and the age by combining the gender and the age estimated of the second frame with the gender and the age estimated of the first frame;
   search the lookup table for a target speed corresponding to the estimated gender and the estimated age; and
   determine the target speed as a movement speed of the robot.

2. The device of claim 1, wherein the controller is configured to assign a different ID to each face detected in the image.

3. The device of claim 1, wherein the controller is configured to estimate the gender and the age corresponding to the face detected in a third frame and additionally correct the gender and the age by combining the gender and the age estimated from the third frame using the gender and the age previously corrected by combining the gender and the age estimated from the second frame with the gender and the age estimated from the first frame.

4. The device of claim 1, wherein the controller is configured to adjust a time required for the movement speed of the robot to reach the target speed.

5. The device of claim 4, wherein the controller is configured to control the movement speed of the robot to be fast by decreasing the time.

6. The device of claim 4, wherein the controller is configured to control the movement speed of the robot to be slow by increasing the time.

7. The device of claim 1, wherein the robot is a product guide robot configured to explain specifications and characteristics of a vehicle to a customer while moving to each vehicle in a vehicle exhibition hall.

8. The device of claim 7, wherein the controller is configured to output various guide messages about the vehicle by voice.

9. A method comprising:
   detecting a face from an image photographed by a camera provided in a robot;
   tracking the detected face;
   estimating a gender and an age corresponding to the face based on a deep learning model by:
     estimating the gender and the age corresponding to the face detected in a first frame;
     estimating the gender and the age corresponding to the face detected in a second frame; and
     correcting the gender and the age by combining the gender and the age estimated of the second frame with the gender and the age estimated of the first frame;
   searching a lookup table for a target speed corresponding to the estimated gender and the estimated age, the lookup table storing target speeds corresponding to genders and ages; and
   determining the target speed as a movement speed of the robot.

10. The method of claim 9, wherein detecting the face comprises assigning an ID to each face detected in the image.

11. The method of claim 9, wherein estimating the gender and the age corresponding to the face further comprises:
   estimating the gender and the age corresponding to the face detected in a third frame; and
   correcting the gender and the age by combining the gender and the age estimated from the third frame with the gender and the age previously corrected by combining the gender and the age estimated from the second frame with the gender and the age estimated from the first frame.

12. The method of claim 9, wherein determining the movement speed of the robot comprises decreasing a time required for the movement speed of the robot to reach the target speed to control the movement speed of the robot to be fast.

13. The method of claim 9, wherein determining the movement speed of the robot comprises increasing a time required for the movement speed of the robot to reach the target speed to control the movement speed of the robot to be slow.

14. The method of claim 9, wherein the robot comprises a product guide robot configured to explain specifications and characteristics of a vehicle to a customer and while moving to the vehicle in a vehicle exhibition hall.

15. The method of claim 14, further comprising outputting by voice various guide messages about the vehicle.

16. A robot comprising:
   a memory configured to store a lookup table in which target speeds corresponding to genders and ages are recorded;
   a camera; and
   a controller configured to:
     detect a face of a person from an image obtained by the camera;
     track the detected face;
     estimate a gender and an age of the person based on a deep learning model by:
       estimating the gender and the age corresponding to the face detected in a first frame;
       estimating the gender and the age corresponding to the face detected in a second frame; and
       correcting the gender and the age by combining the gender and the age estimated of the second frame with the gender and the age estimated of the first frame;
     search the lookup table for a target speed corresponding to the estimated gender and the estimated age;
     determine the target speed as a movement speed of the robot to a target point; and
     output various guide messages by voice while moving to the target point at the movement speed.

17. The robot of claim 16, wherein the controller is configured to estimate the gender and the age corresponding to the face detected in a third frame and additionally correct the gender and the age by combining the gender and the age estimated from the third frame using the gender and the age previously corrected by combining the gender and the age estimated from the second frame with the gender and the age estimated from the first frame.

18. The robot of claim 16, wherein the controller is configured to adjust a time required for the movement speed of the robot to reach the target speed.

19. The robot of claim 18, wherein the controller is configured to control the movement speed of the robot to be fast by decreasing the time.

20. The robot of claim 18, wherein the controller is configured to control the movement speed of the robot to be slow by increasing the time.

* * * * *